United States Patent
Chahal

(10) Patent No.: US 10,331,713 B1
(45) Date of Patent: Jun. 25, 2019

(54) USER ACTIVITY ANALYSIS USING WORD CLOUDS

(71) Applicant: Gurbaksh Singh Chahal, Miami, FL (US)

(72) Inventor: Gurbaksh Singh Chahal, Miami, FL (US)

( * ) Notice: Subject to any disclaimer, the term of this patent is extended or adjusted under 35 U.S.C. 154(b) by 0 days.

(21) Appl. No.: 16/150,988

(22) Filed: Oct. 3, 2018

(51) Int. Cl.
| | | |
|---|---|---|
| *G06F 17/30* | (2006.01) | |
| *G06F 16/31* | (2019.01) | |
| *G06F 16/35* | (2019.01) | |
| *G06F 16/335* | (2019.01) | |
| *G06F 16/951* | (2019.01) | |
| *G06F 16/33* | (2019.01) | |

(52) U.S. Cl.
CPC .......... *G06F 16/313* (2019.01); *G06F 16/335* (2019.01); *G06F 16/3347* (2019.01); *G06F 16/35* (2019.01); *G06F 16/951* (2019.01)

(58) Field of Classification Search
CPC .......... G06F 17/30616; G06F 17/3069; G06F 17/30699; G06F 17/30705; G06F 17/30864; G06F 16/313; G06F 16/3347; G06F 16/35; G06F 16/335; G06F 16/951
See application file for complete search history.

(56) References Cited

U.S. PATENT DOCUMENTS

| | | | |
|---|---|---|---|
| 6,236,768 B1 | 5/2001 | Rhodes et al. | |
| 7,788,262 B1 | 8/2010 | Shirwadkar | |
| 7,797,421 B1 | 9/2010 | Scofield et al. | |
| 7,836,108 B1 | 11/2010 | Kupke et al. | |
| 8,086,591 B2 | 12/2011 | Scott et al. | |
| 8,341,095 B2 | 12/2012 | Bai et al. | |
| 8,549,016 B2 | 10/2013 | Stefik et al. | |
| 8,812,651 B1 | 8/2014 | Eriksen et al. | |
| 9,047,283 B1 | 6/2015 | Zhang et al. | |
| 9,356,993 B1 | 5/2016 | Kothari et al. | |
| 2005/0108001 A1 | 5/2005 | Aarskog | |
| 2007/0282785 A1 | 12/2007 | Fayyad et al. | |
| 2008/0209339 A1* | 8/2008 | Macadaan | G06F 3/0482 715/745 |
| 2008/0243780 A1 | 10/2008 | Nance et al. | |
| 2008/0294607 A1 | 11/2008 | Partovi et al. | |
| 2009/0030899 A1 | 1/2009 | Tareen et al. | |
| 2009/0313245 A1 | 12/2009 | Weyl et al. | |
| 2010/0030552 A1* | 2/2010 | Chen | G06F 17/30734 704/9 |
| 2010/0070448 A1 | 3/2010 | Omoigui | |
| 2010/0138452 A1 | 6/2010 | Henkin et al. | |

(Continued)

*Primary Examiner* — Jared M Bibbee
(74) *Attorney, Agent, or Firm* — Christopher & Weisberg, P.A.

(57) ABSTRACT

A method, device, and system for determining attributes of at least one user from words of at least one document. A user profile vector based at least on the at least one document experienced by the at least one user is provided. At least one weight is determined for at least one word in the at least one document, the at least one weight being based at least on the time that the at least one document was experienced by the user and the frequency with which the user experienced the at least one document; and a word cloud associated with the user is generated, the word cloud including the at least one word from the at least one document if the corresponding at least one weight of the at least one word at least meets a threshold.

19 Claims, 7 Drawing Sheets

(56) References Cited

U.S. PATENT DOCUMENTS

| | | |
|---|---|---|
| 2010/0205541 A1 | 8/2010 | Rapaport et al. |
| 2010/0306249 A1 | 12/2010 | Hill et al. |
| 2011/0271232 A1 | 11/2011 | Crochet et al. |
| 2011/0295612 A1* | 12/2011 | Donneau-Golencer ................... G06Q 30/02 705/1.1 |
| 2012/0054209 A1 | 3/2012 | Priyadarshan et al. |
| 2012/0303637 A1* | 11/2012 | Carmel ................ G06F 17/241 707/749 |
| 2013/0073400 A1 | 3/2013 | Heath |
| 2013/0204885 A1 | 8/2013 | Clinchant et al. |
| 2015/0026192 A1* | 1/2015 | Kamerman ........... G06F 16/335 707/748 |
| 2015/0289120 A1 | 10/2015 | Harber et al. |
| 2015/0310115 A1 | 10/2015 | Ryger et al. |
| 2016/0070762 A1* | 3/2016 | Nicholls ........... G06F 17/30864 707/722 |
| 2017/0154107 A1* | 6/2017 | Awad ................ G06F 17/30705 |
| 2017/0270192 A1* | 9/2017 | Breedvelt-Schouten ................... G06F 16/313 |

\* cited by examiner

PERSONA BUILDER

Keyword Search

Age

Gender

Language

Location

Attributes

UNIQUE REACH     62,650,000

MONTHLY
IMPRESSIONS     32,502,204

Save Persona

Update

FIG. 7

USER ACTIVITY ANALYSIS USING WORD CLOUDS

TECHNICAL FIELD

The present invention relates to analyzing user activity on a computer network, and more particularly to the creation of the word clouds associated with the user based at least on weights assigned to words from a document experienced by the user over a network.

BACKGROUND

A user may visit one or more website pages or other digital content over a network, such as the Internet. Content provided over networks are pervasive and widely varied. For example, content may be user-generated content (e.g., social media) or content from content providers (e.g., news networks) or a variety of other types of information (e.g., metadata). A user may visit websites that are of interest to the user and may also visit some websites that are not particularly of interest to the user (e.g., by accident or as a one-time occurrence). Furthermore, the visited websites may be associated with information that is relevant to the user for a particular purpose and may also be associated with information that is not particularly relevant to the user for such purposes. However, it may be technically difficult for a network device to understand what content and information is of interest to a human user or not of interest to the user. It may also be technically difficult for a network device to be able to discern what information is relevant and what information is not relevant because, conventionally, network devices do not understand human behavior and are not able to make subjective determinations about what may or may not be relevant and/or interesting to human users.

SUMMARY

According to one aspect of the present disclosure, a computing device for determining attributes of at least one user from words of at least one document experienced by the at least one user via a network is provided. The computing device includes processing circuitry and at least one memory storing instructions executable by the processing circuitry to: provide a user profile vector based at least on at least one document experienced by a user, the user profile vector including an indication of a time that the at least one document was experienced by the user, and an indication of a frequency with which the user has experienced the at least one document; determine a corresponding at least one weight for at least one word in the at least one document, the corresponding at least one weight being based at least on the time that the at least one document was experienced by the user and the frequency with which the user experienced the at least one document; and generate a word cloud associated with the user, the word cloud including the at least one word from the at least one document if the corresponding at least one weight of the at least one word at least meets a threshold.

According to this aspect of the present disclosure, in some embodiments, the threshold includes a cutoff score used to filter out words that are not statistically relevant to the user. In some embodiments of this aspect, the user profile vector further includes a user identifier associating each data element in the user profile vector with the user. In some embodiments of this aspect, the processing circuitry is further configured to: communicate with at least one database; and cause the user profile vector and the associated word cloud to be stored in the at least one database, the at least one database being configured to be keyword searchable, via a user interface with at least one keyword search field, to: identify user profile vectors stored in the at least one database associated with word clouds having one or more words matching at least one user-input keyword, and identify how many of the user profile vectors have word clouds with at least one word matching the at least one user-input keyword. In some embodiments of this aspect, the processing circuitry is further configured to generate the word cloud associated with the user by being configured to at least: identify co-occurring words in the at least one document; determine a word similarity index score for each of the identified co-occurring words; and group each of the co-occurring words together based on the corresponding word similarity index score. In some embodiments of this aspect, the processing circuitry is further configured to group each of the co-occurring words together based on the corresponding word similarity index score by being configured to use the similarity index score to form a cluster of words where word groups having a similarity index score above a similarity threshold are clustered together, the cluster of words representing how similar each word in the word groups are to one another. In some embodiments of this aspect, the processing circuitry is further configured to calculate a term frequency-inverse document frequency (tfidf) score for the at least one word, the tfidf score representing a weighting factor that is a statistical measure of a relevance of the at least one word, the weighting factor being used at least in part to determine the corresponding at least one weight for the at least one word. In some embodiments of this aspect, the processing circuitry is further configured to generate the word cloud associated with the user by being configured to: create a document vector for each of at least one collected word from the at least one document, the at least one collected word being collected by parsing content from the at least one document, and, for each of the at least one collected word, the document vector including at least a document identifier and an indication of a part of speech of the word. In some embodiments of this aspect, the at least one document is at least one website visited by the user and the at least one word is at least one word associated with the at least one website visited by the user. In some embodiments of this aspect, the at least one word associated with the at least one website visited by the user includes at least one of metadata associated with the at least one website, website content of the at least one website, and website content from an influential link from the at least one website to another website. In some embodiments of this aspect, the corresponding at least one weight is a weighting function, the weighting function including at least one weighting factor, at least one weighting factor of the at least one weighting factor representing relevance of the at least one word to content of the at least one document. In some embodiments of this aspect, the processing circuitry is further configured to: periodically collect words from a plurality of documents experienced by the user; and dynamically update the word cloud associated with the user based at least on the periodic collecting. In some embodiments of this aspect, the corresponding at least one weight includes a weighting factor that is based on a duration, the duration beginning with the time that the at least one document was experienced to a second time, the second time occurring after the time. In some embodiments of this aspect, the indication of the frequency with which the user has experienced the at least one document represents a number of times that the at least one word has been independently parsed from the at least one document as a result of an instance of visitation of the at least one document by the user. In some embodiments of this aspect, the processing circuitry is in communication with a mapping layer, the mapping layer configured to: receive data from one or more applications in communication with a user equipment of the user over a network; and normalize the data to a data format recognizable by a word cloud engine configured to generate the word cloud associated with the user. In some embodiments of this aspect, the instructions stored on the at least one memory correspond to a word cloud engine configured to generate the word cloud associated with the user and periodically update the word cloud based on new user data input into the word cloud engine. In some embodiments of this aspect, each word in the word cloud associated with the user reflects an attribute of the user, the attribute including at least one of a characteristic of the user, an interest of the user, and a demographic associated with the user.

According to another aspect of the present disclosure, a method for determining attributes of at least one user from words of at least one document experienced by the at least one user via a network is provided. The method includes providing a user profile vector based at least on at least one document experienced by a user, the user profile vector including an indication of a time that the at least one document was experienced by the user, and an indication of a frequency with which the user has experienced the at least one document; determining a corresponding at least one weight for at least one word in the at least one document, the corresponding at least one weight being based at least on the time that the at least one document was experienced by the user and the frequency with which the user experienced the at least one document; and generating a word cloud associated with the user, the word cloud including the at least one word from the at least one document if the corresponding at least one weight of the at least one word at least meets a threshold.

According to this aspect, in some embodiments, the method further includes periodically collecting words from a plurality of documents experienced by the user; and dynamically updating the word cloud associated with the user based at least on the periodic collecting.

According to yet another aspect of the present disclosure, a system for determining attributes of at least one user from words of at least one document experienced by the at least one user via a network is provided. The system includes processing circuitry configured to: provide a user profile vector based at least on at least one document experienced by a user, the user profile vector including an indication of a time that the at least one document was experienced by the user, and an indication of a frequency with which the user has experienced the at least one document; determine a corresponding at least one weight for at least one word in the at least one document, the corresponding at least one weight being based at least on the time that the at least one document was experienced by the user and the frequency with which the user experienced the at least one document; and generate a word cloud associated with the user, the word cloud including the at least one word from the at least one document if the corresponding at least one weight of the at least one word at least meets a threshold. The system further includes at least one database in communication with the processing circuitry, the at least one database being configured to store the user profile vector and being configured to be key word searchable, via a user interface, to: identify user profile vectors stored in the at least one database associated with word clouds having one or more words matching at least one user-input keyword, and identify how many of the user profile vectors have word clouds with at least one word matching the at least one user-input keyword.

BRIEF DESCRIPTION OF THE DRAWINGS

FIG. 7 is a illustrates an exemplary user interface according to one embodiment of the present disclosure.

DETAILED DESCRIPTION

Figure 1:
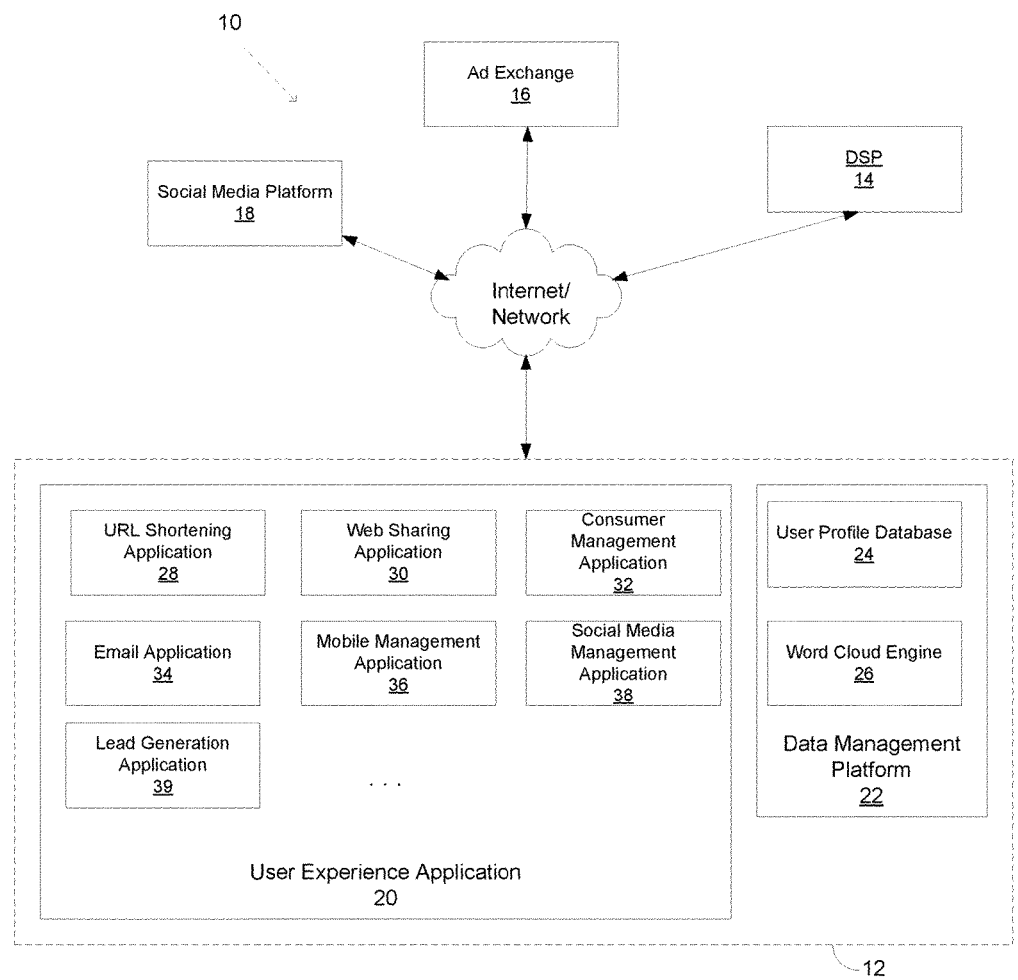
FIG. 1 is a block diagram of an exemplary network architecture according to one embodiment of the present disclosure.

Before describing in detail exemplary embodiments, it is noted that the embodiments reside primarily in combinations of apparatus components and processing steps related generating a word cloud tag. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

In some embodiments, the term "document" indicates at least one resource provided over a network that is associated with a resource address, such as, for example, a website associated with an Internet Protocol (IP) address. The document may be, for example, a web page, an HTML page, a mobile application page, and the like. In other embodiments, the document may also include other resources provided over the network, such as, for example, an email, a portable format document, etc. or other computer-displayable documents that include one or more words and is provided over a network.

In some embodiments, the term "word cloud" and "tag cloud" and "word cloud user profile" and the like may be used herein interchangeably to indicate a representation of words that are grouped together according to certain parameters, such as, for example, statistically determined weights and/or scores. In some embodiments, the word cloud may be a representation of text data corresponding to human language words that are grouped together over a plot and may be represented visually in some aspects and/or in a programming data object configured to logically represent word clouds in some aspects.

In some embodiments, the term "user," "advertiser," and the like may be used to indicate a user of an electronic device, even where the term electronic device is not expressly used. Such users of electronic devices may interact with the electronic device to cause the electronic device and/or other electronic devices and/or systems to perform one or more of the processes and techniques described herein associated with providing a word cloud user profile. In some embodiments, the term "user" may be used to indicate a user-consumer/potential consumer that experiences a document on the network, such as a website. In some embodiments, the term "user" may be used to indicate an advertiser that interacts with the system to obtain information from the system to identify user-consumers/potential consumers.

In some embodiments, the term "vector" is used to indicate a logical element or type of programming container to store data, such as, for example, an array for storing one or more distinct data elements.

Note further, that functions described herein as being performed by a computing device may be distributed over a plurality of computing devices. In other words, it is contemplated that the functions of the computing device described herein are not limited to performance by a single physical device and, in fact, can be distributed among several physical devices. Further, it is contemplated that the functions and methods described herein are not limited to performance by a single set of computer instructions on a single physical device and, in fact, can be distributed among several sets of computing instructions (e.g., software application) on several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments of the present invention provide for the generation of a word cloud user profile that involves extracting relevant words from digital content experienced by a user, analyzing words to form groupings (e.g., a word cloud) based on certain statistical parameters (e.g., weights), and providing useful information regarding conventionally subjective aspects of human behavior, such as, for example, determining potential interests and characteristics of human users. These potential interests can be used to customize content provided to the users.

Referring now to the drawings, in which like reference designators refer to like elements, there is shown in FIG. 1 an exemplary network architecture, generally designated as "10". The exemplary network can include a management platform 12, a demand side platform 14, an advertisement exchange 16, and a social media platform 18, communicatively coupled to one another over a network, in communication with one another, via one or more communication links, paths, connections, and/or networks (e.g., the Internet, intranet, ad hoc networks, etc.) using one or more communication protocols (e.g. Hypertext Transfer Protocol (HTTP) and other network protocols), where at least one or more elements of the management platform 12 may be configured to perform one or more of the methods and techniques described herein. Although the system 10 depicted in FIG. 1 includes a single management platform 12, a single demand side platform 14, a single advertisement exchange 16, and a single social media platform 18, it is contemplated that the system 10 may include any number of management platforms 12, demand side platforms ("DSPs") 14, advertisement exchanges ("ad exchanges") 16, and social media platforms 18, that may be in communication over one or more networks.

The management platform 12 may be configured to manage user experiences from a multitude of users over the network. In one embodiment, the management platform 12 may be considered a vertically integrated brand management platform. In other embodiments, the management platform 12 may be other types of user experience platforms involved in the management of user experiences and activities over the network.

In one embodiment, the management platform 12 may include a plurality of user experience applications 20, where the number of user experience applications 20 within the management platform 12 can be any number. The user experience applications 20 may be configured to create and otherwise manage content to be distributed to users across a plurality of platforms.

The management platform 12 may also include a data management platform 22 for collecting, storing, and searching data collected by the user experience applications 20. The data management platform 22 may include a user profile database 24 for storing the data collected and a word cloud engine 26. In some embodiments, the user experiences applications 20 can also include applications for the collection and cultivation of data regarding users and content. The exemplary user experience applications 20 depicted in FIG. 1 include a URL shortening application 28, web sharing application 30, consumer management application 32, email application 34, mobile management application 36, social media management application 38, and lead generation application 39. In one embodiment, these applications 28, 30, 32. 34, 36, 38, and 39 may work together to manage various aspect of network user experiences and may be used to collect data for use with embodiments of the present disclosure to create word clouds. In other words, it is contemplated that different applications can be used to collect data, and embodiments for the data collection are not limited solely to those depicted and described herein.

The ad exchange 16 may be considered an exchange platform that enables advertisers and publishers of digital content to buy and sell digital advertising space, often through a real-time bidding (RTB) ecosystem. Generally, when a user initially accesses a document, such as, for example, a website, the website will have spaces that can be filled with digital advertising inventory (e.g., creatives). A publisher/content provider, such as an owner of the website, may sell those spaces to the ad exchange 16. The ad exchange 16 can fill those spaces by selling the space to advertisers. As multiple advertisers may be interested in supplying creatives to the individual user at varying prices, the ad exchange 16 utilizes an RTB ecosystem whereby the advertisers may bid on the placement of their creatives based on a profile of the user that the ad exchange 16 may provide to the advertisers. RTB should generally occur within a fraction of a second. The advertiser may pay the ad exchange 16 to distribute the creative, and a portion of the payment to the ad exchange 16 may be passed onto the website owner in exchange for allowing the creative to be displayed within the space provided by the website owner's website.

Different ad exchanges 16 may have access to different pools of users and prices. Thus, advertisers may distribute their creatives across a plurality of ad exchanges 16 to access different pools of users.

The DSP 14 is a system configured to allow advertisers to manage and bid on impressions associated with digital advertising inventory from one or more ad exchanges 16 using a unified interface.

The social media platform 18 is a platform for users to engage in social media communication, such as posting user-provided content, text-based communication exchange between social media users, following other users, and the like.

Continuing to refer to FIG. 1, an embodiment of each of the plurality of the user experience applications 20 (28, 30, 32, 34, 36, 38, 39) that may collect and cultivate data for use by, for example, the word cloud engine 26 will now be described. Stated another way, the user experience applications 20 may interact with network users to provide user content data that can be analyzed and used to generate a word cloud associated with each user according to one or more of the techniques described herein.

The URL shortening application 28 may be a Universal Resource Locator (URL) shortening and custom URL generation application, such as, for example, TRIM by Gravity4, Inc. URL shortening application 28 may be configured to provide a URL shortening service or custom URL creation for users. URL shortening application 28 may be configured to receive a link to a networked content and produce a shortened link to a first website that may redirect to the networked content. The shortened link can also be of any length, though a user-friendly form is preferred. In some embodiments, the first website may be considered a "vanity site" that is created specifically for the link. In other embodiments, the link is to a second site that may be considered a "deep link." In this manner, the user's experience can be managed for linked content. In one embodiment, URL shortening application 28 can detect and log when and where a user clicks the shortened link and may be able to track when and where a shortened link is shared online. URL shortening application 28 may be configured to compile and present data connected to the shortened links. In some embodiments, URL shortening application 28 may be configured to assign each user that experiences (e.g., interacts with, or views) the content a unique identifier. Such unique identifier, as well as other tracking data can be stored in database and/or used by the data management platform 22. In some embodiments, the unique identifier can be used by the management platform 12 to associate a plurality of instances of user activity with particular users to create unique user profiles for such users.

Web sharing application 30 may provide and monitor intelligent web sharing, such as the application ADDNOW by Gravity4, Inc. Web sharing application 30 may be configured to determine what key words, content, hashtags, and the like become popular (e.g., go viral) by analyzing data across the network, such as, the Internet. In some embodiments, web sharing application 30 can track link sharing behavior in the social media platforms 18, social channels considered "dark social," and other social digital communities on the network. "Dark social" includes social channels that are difficult to detect and track, such as, for example, messaging and email communications. In some embodiments, web sharing application 30 can store the content connected to links that are shared between users. In such embodiments, web sharing application 30 provides a web-based "copy-paste" function where users can share content, not just a link to content hosted elsewhere. In addition to storing the content, web sharing application 30 may further track usage data related to when and where the content is shared. In some embodiments of web sharing application 30, users that receive or shared content are assigned a unique identifier. The identifier and other data associated with such users' online activity, as well as, content received and shared between such users can be stored in the user profile database 24. In some embodiments, web sharing application 30 can be a widget, a set of computer instructions, a plug-in, or the like that can generate a link and/or icon for users to share content, which content may be trackable by web sharing application 30 and, in embodiments, associated with specific users and their unique identifiers.

Consumer management application 32 may provide services associated with the acquisition and management of consumers, such as the application CRM.ME by Gravity4, Inc. In some embodiments, consumer management application 32 can provide template messages to send to potential consumers. Consumer management application 32 can also provide a form on a website whereby users can input their contact information. Thus, the form may allow users to join message lists or express an interest in a product or service. Consumer management application 32 may then record and store data that the users have submitted via the form, or other user interface. In some embodiments, consumer management application 32 can have predefined triggers that can commence certain marketing events or campaigns. For example, when a user visits a web page, consumer management application 32 may be configured to send an email communication based on a preconfigured template. Consumer management application 32 may provide, for example, for back-end users, a visualization of collected data.

Consumer management application 32 can also manage consumer or user information for support personnel, such as, sales personnel. In some embodiments, "gamification" concepts may be used to measure and report key performance indicators. For example, when a sales person achieves a goal, application 32 can be configured to present such sales person with a reward. In some embodiments, consumer management application 32 can create comparison performance metrics for each sales person. The performance metrics can thus provide sales personnel with an indication of their level of performance, as compared to their associates, thereby fostering a sense of competition. In some embodiments, these performance metrics are summary data or sales statistics. The performance metrics can also include non-monetary statistics, such as, for example, how many phone calls the sales person made during a certain time period.

In some embodiments, consumer management application 32 can manage leads which might later convert into consumers. Such leads can be managed separately or in combination with the user profile database 24. Consumer management application 32 may be configured to maintain a dynamic queue of leads and contacts, presenting a sales person with leads and consumers that may be optimal for the sales person to contact. Consumer management application 32 can track the relations between customers and salespeople. For example, consumer management application 32 can record that a customer spoke with a first sales person on the phone and a second sales person in-person. Consumer management application 32 can set triggers and route customers based on the customer's tracked actions. Consumer management application 32 can create an organization of teams of sales people. Consumer management application 32 can establish and enforce geographical sales territories. Consumer management application 32 can be configured to create custom fields in a customer entry interface. In some embodiments, consumer management application 32 can actually call customers directly instead of requiring the sales person to manually obtain the customer's contact information and physically dialing the phone.

Consumer management application 32 can also manage tasks and sub-tasks. Consumer management application 32 can record user activities related to such tasks and sub-tasks. User activities may include, for example, meetings, emails, messages, file transfers, etc. In some embodiments, customers/users may be assigned a unique identifier. The identifiers, data related to the customer/user's interactions with sales people, and other interaction data associated with the consumer management application 32 can be stored in the user profile database 24.

Email application 34 may be configured to present an interface to creating marketing emails, such as the application DELIVER.ME by Gravity4, Inc. The interface can be configured as, for example, a "drag and drop" interface and/or may provide pre-configured templates to facilitate efficient email creation. In some embodiments, email application 34 can track user interaction data, such as, for example, message opened, message forwarded, unsubscribed, etc. In some embodiments, email application 34 can be considered a widget or plug-in that can be inserted into a website or platform. In some embodiments, users receiving marketing emails, via the email application 34, may be assigned a unique identifier. Such unique identifiers and other data associated with the email application 34 may be collected and stored in the user profile database 24.

Mobile management application 36 can collect and present user interaction data, such as user interactions/experiences with mobile applications ("apps"), such as the application UNIFY.ME by Gravity4, Inc. In some embodiments, mobile management application 36 can monitor, for example, downloads, time spent interacting with the app, time spent with the app opened on the mobile device, page visits, push notifications sent, push notifications opened, and other user interaction/experience data. Mobile management application 36 can, for example, group users into segments based on information, such as, for example, event occurrences, geo-location data, proximity to other devices, etc. For example, mobile management application 36 can group users who interact with a specific push notification and that also appear to reside in a certain geographic area, or are close to a connected smart-watch. In some embodiments, mobile management application 36 may send push notifications in response to a predetermined event trigger. For example, responsive to mobile management application 36 detecting that a user has visited a predetermined page, mobile management application 36 may send a push notification to the user. In some embodiments, mobile management application 36 may be configured to monitor user activities on the mobile devices. In some embodiments, such users may be assigned a unique identifier. Such identifiers and the interaction/experience data collected by mobile management application 36 may be stored in the user profile database 24.

Social media management application 38 can be a unified social media platform, such as the application REACH.ME by Gravity4, Inc. In some embodiments, social media management application 36 can be used to post on multiple social media platforms 18, simultaneously. For example, a user may create content on social media management application 36 and then instruct social media management application 36 to simultaneously push the user-created content on various social media platforms 18. In some embodiments, the publication is performed on a predetermined scheduled or delayed basis. The publication may also be performed by social media management application 36 as a result of predetermined triggers (e.g., user-created triggers, anniversaries, birthdays, etc.). Social media management application 36 may be configured to monitor and record data associated with the published user-created content. Such data may include, for example, conversations, clicks, interactions, reach, messaging between users, etc. Such data can also be grouped and analyzed based on, for example, an audience segment. Social media management application 36 can allow multiple users to access a singular profile on social media management application 36. These multiple users can have varying levels of permission related to the profile of an account associated with the social media management application 36. For example, some users may be able to publish content, while some users may be authorized to send messages. In some embodiments, social media management application 36 can collect data from a social media profile associated with individuals from the social media platform 18. In some embodiments, social media management application 36 may associate such data with a unique identifier associated with a user and more store the data and the identifier in the user profile database 24.

Lead generation application 39 may be an automated lead generation platform, such as CROSSGRAPH by Gravity4, Inc. In some embodiments, lead generation application 39 may utilize data received from the other user experience applications 20, such as, for example, consumer management application 32 and email application 34, to generate contacts that may lead to a sale or other favorable outcomes. In some embodiments, lead generation application 39 can generate leads from a user's existing cluster of customers to perform retargeting or to create similar audience segments that could potentially convert at similar rates. In other embodiments, lead generation application 39 can track and analyze conversion rates for each generation lead. In other embodiments, lead generation application 39 may be configured to provide visualization on, for example, a computer display, of the tracked and analyzed conversion rates for each generated lead to users of lead generation application 39.

It should be understood that the set of user experience applications 20 associated with the management platform 12 may include more or less than the application described herein above, which are exemplary applications. Collectively, the user experience applications 20 may provide a wide scope of coverage for reaching and tracking users over the network in a variety of digital environments. The collected data can be stored in the user profile database 24 and/or used by the data management platform 22 to perform various functions, such as, for example, generate a word cloud to be associated with a user and/or update the word cloud associated with the user based on new user experience data.

Generally, while each application may, in some embodiments, have its own unique identifier for each user, such identifiers can be resolved to a global user identifier for a specific user in the data management platform 22. Stated another way, each user may be associated with an identifier for each application; but, each of such identifiers may be linked to the global user identifier for the user within the data management platform 22 so that all the data collected across the applications 20 can be associated or linked to the specific user. The user identifier may be an alphanumeric code, text, or other any type of user identifier. In one embodiment, the user identifier may be a key in a relational database corresponding to the user profile database 24. In one embodiment, the user identifier ("ID") in the user profile database 24 is associated with a multitude of information associated with the user, such as, for example, one or more Internet Protocol (IP) addresses, one or more geo-locations for the user, a hashed email address, any combination of these, and a hashed phone number a social network user ID (e.g., from a pixel such as a transparent pixel on, for example, an authentication page).

Generally, data from the user experience applications 20 interacting with users over the network and the data from these interactions can be fed into the word cloud engine 26 for analyzing the data and generating word clouds associated with the users based on such data analysis. The data management platform 22, which includes the word cloud engine 26 and the user profile database 24, may be accessed by, for example, advertisers to identify users for targeting an advertisement campaign. In other words, the word cloud user profiles (generated by word cloud engine 26 and stored in user profile database 24) can be considered a new type of user profile accessible by advertisers to identify users that can be targeted for advertisements. Based on the identification of these users, advertisers can use the DSP 14 to bid on the ad exchange 16 to be able to advertise to these identified users. Data from social media platforms 18 associated with the users can also be fed into the word cloud engine 26 for formulating word cloud user profiles associated with such users.

Figure 2:
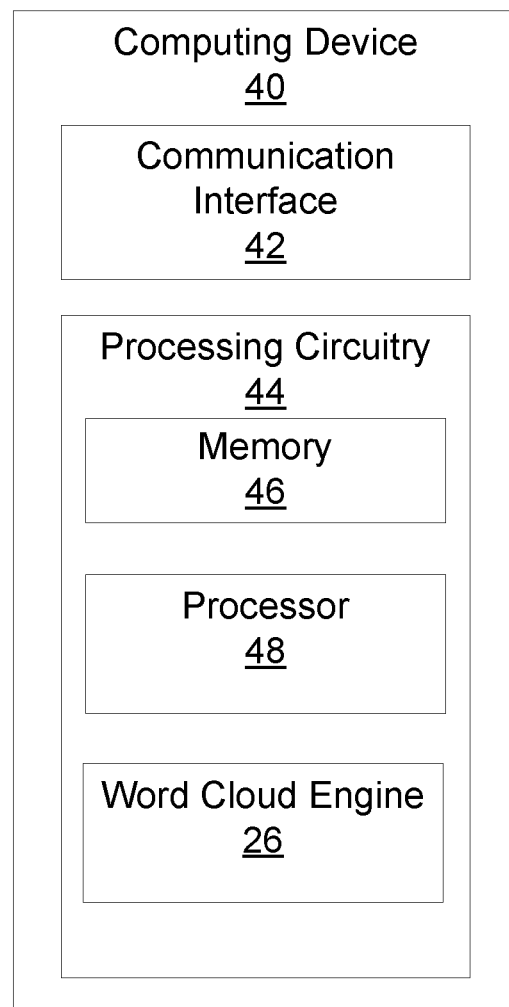
FIG. 2 is a block diagram of an exemplary computing device according to one embodiment of the present disclosure.

Having described each element of the network architecture of the system 10 shown in FIG. 1, some embodiments of the present disclosure will now be described with reference to the block diagram of FIG. 2. FIG. 2 illustrates an exemplary computing device 40 according to one embodiment of the present disclosure. The computing device 40 may include hardware and/or may run software configured to implement one or more of the techniques and methods described herein for providing a word cloud according to the disclosure. For example, in one embodiment, the computing device 40 may include the word cloud engine 26 and the user profile database 24 described with reference to FIG. 1. In other embodiments, the user profile database 24 may separate from and in communication with the computing device 40. For ease of understanding, the computing device 40 is described with reference to the word cloud engine 26 and the user profile database 24. It is contemplated that, in some embodiments, one or more of the user experience applications 20 and/or parts or all of data management platform 22 may also be implemented by and/or included in the computing device 40. In other embodiments, one or more of the user experience applications 20 may be run on computing devices separate from but in communication with the computing device 40. The one or more user experience applications 20 and/or data management platform 22 and/or parts thereof may be implemented across multiple computing devices 40 and/or distributed in a cloud computing environment. In such cases, is it contemplated that these separate computing devices can have the same general computing architecture, i.e., hardware arrangement, as the computing device 40.

In some embodiments, the computing device 40 includes a communication interface 42, processing circuitry 44, and memory 46. The communication interface 42 may be configured to communicate with other networked devices and elements in the system 10 (e.g., the management platform 12, the demand side platform 14, the ad exchange 16, the social media platform 18, content provider servers, etc.). In some embodiments, the communication interface 42 may be formed as or may include, for example, one or more radio frequency (RF) transmitters, one or more RF receivers, and/or one or more RF transceivers, and/or may be considered a radio interface. In some embodiments, the communication interface 42 may include a wired and/or a wireless interface. In one embodiment, the communication interface 42 may include or be associated with a network interface element, such as, for example, network interface card.

The processing circuitry 44 may include one or more processors 48 and memory, such as, the memory 46. In particular, in addition to a traditional processor and memory, the processing circuitry 44 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 48 and/or the processing circuitry 44 may be configured to access (e.g., write to and/or read from) the memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the computing device 40 may further include software stored internally in, for example, memory 46, or stored in external memory (e.g., database) accessible by the computing device 40 via an external connection. The software may be executable by the processing circuitry 44. The processing circuitry 44 may be configured to control any of the methods and/or processes described herein and/or to cause such methods, and/or processes to be performed, e.g., by the computing device 40. The memory 46 is configured to store data, programmatic software code and/or other information described herein. In some embodiments, the software may include instructions that, when executed by the processor 48 and/or processing circuitry 44, causes the processor 48 and/or processing circuitry to perform the processes described herein with respect to the computing device 40. In particular, the instructions stored in the memory 46 may be instructions for implementing the methods and techniques described herein for the word cloud engine 26.

The computing device 40 may be considered a computing device implementing the word cloud engine 26 for determining attributes of at least one user from words of at least one document experienced by the at least one user via a network. The processing circuitry 44 may include and/or may implement the word cloud engine 26 to cause the processing circuitry 44 to perform one or more of the techniques discussed herein for the word cloud engine 26. The processing circuitry 44 may be configured to provide a user profile vector based at least on at least one document experienced by a user, the user profile vector including an indication of a time that the at least one document was experienced by the user, and an indication of a frequency with which the user has experienced the at least one document. The processing circuitry 44 may also be configured to determine a corresponding at least one weight for at least one word in the at least one document, the corresponding at least one weight being based at least on the time that the at least one document was experienced by the user and the frequency with which the user experienced the at least one document. The processing circuitry 44 may be further configured to generate a word cloud associated with the user, the word cloud including the at least one word from the at least one document if the corresponding at least one weight of the at least one word at least meets a threshold. In some embodiments, the threshold includes a cutoff score used to filter out words that are not statistically relevant to the user. The generated word cloud may be stored in the user profile database 24, which database 24 may be accessible by advertisers searching for target users for one or more their advertising campaigns.

According to this aspect of the computing device 40, in some embodiments, the user profile vector further includes a user identifier associating each data element in the user profile vector with the user. In some embodiments, the processing circuitry 44 is further configured to communicate with the at least one database (e.g., database 24, memory 46); and cause the user profile vector and the associated word cloud to be stored in the at least one database 24. In some embodiments, the at least one database 24 may be configured to be keyword searchable, via a user interface with at least one keyword search field, to: identify user profile vectors stored in the at least one database 24 associated with word clouds having one or more words matching at least one user-input keyword, and identify how many of the user profile vectors have word clouds with at least one word matching the at least one user-input keyword.

In some embodiments, the processing circuitry 44 is further configured to generate the word cloud associated with the user by being configured to at least: identify co-occurring words in the at least one document; determine a word similarity index score for each of the identified co-occurring words; and group each of the co-occurring words together based on the corresponding word similarity index score. In some embodiments, the processing circuitry 44 is further configured to group each of the co-occurring words together based on the corresponding word similarity index score by being configured to use the similarity index score to form a cluster of words where word groups having a similarity index score above a similarity threshold are clustered together, the cluster of words representing how similar each word in the word groups are to one another. In some embodiments, the processing circuitry 44 is further configured to calculate a term frequency-inverse document frequency (tfidf) score for the at least one word, the tfidf score representing a weighting factor that is a statistical measure of a relevance of the at least one word, the weighting factor being used at least in part to determine the corresponding at least one weight for the at least one word. In some embodiments, the processing circuitry 44 is further configured to generate the word cloud associated with the user by being configured to create a document vector for each of at least one collected word from the at least one document, the at least one collected word being collected by parsing content from the at least one document, and, for each of the at least one collected word, the document vector including at least a document identifier and an indication of a part of speech of the word. In some embodiments, the at least one document is at least one website visited by the user and the at least one word is at least one word associated with the at least one website visited by the user. In some embodiments, the at least one word associated with the at least one website visited by the user includes at least one of metadata associated with the at least one website, website content of the at least one website, and website content from an influential link from the at least one website to another website. In some embodiments, the corresponding at least one weight is a weighting function, the weighting function including at least one weighting factor, at least one weighting factor of the at least one weighting factor representing relevance of the at least one word to content of the at least one document. In some embodiments, the processing circuitry 44 is further configured to: periodically collect words from a plurality of documents experienced by the user, and dynamically update the word cloud associated with the user based at least on the periodic collecting.

In some embodiments, the corresponding at least one weight includes a weighting factor that is based on a duration, the duration beginning with the time that the at least one document was experienced to a second time, the second time occurring after the time. In some embodiments, the indication of the frequency with which the user has experienced the at least one document represents a number of times that the at least one word has been independently parsed from the at least one document as a result of an instance of visitation of the at least one document by the user. In some embodiments, the processing circuitry 44 is in communication with a mapping layer and the mapping layer is configured to receive data from one or more applications in communication with a user equipment of the user over a network; and normalize the data to a data format recognizable by a word cloud engine 26 configured to generate the word cloud associated with the user. In some embodiments, the instructions stored on the at least one memory 46 correspond to a word cloud engine 26 configured to generate the word cloud associated with the user and periodically update the word cloud based on new user data input into the word cloud engine 26. In some embodiments, each word in the word cloud associated with the user reflects an attribute of the user, the attribute including at least one of a characteristic of the user, an interest of the user, and a demographic associated with the user.

Figure 3:
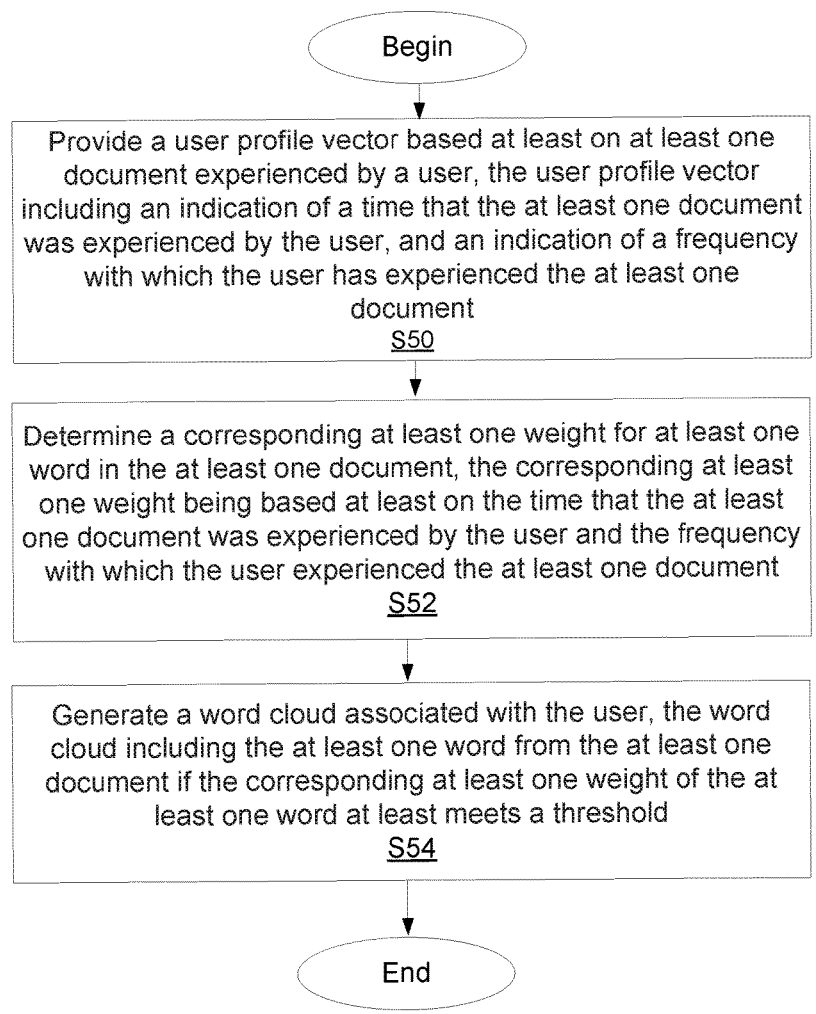
FIG. 3 is a flowchart of an exemplary method according to one embodiment of the present disclosure.

FIG. 3 is a flowchart illustrating an exemplary method implemented in at least one computing device 40, which may in some embodiments be performed by the word cloud engine 26. The exemplary method is for determining attributes of at least one user from words of at least one document experienced by the at least one user via a network. According to one embodiment, the method includes providing a user profile vector based at least on at least one document experienced by a user, the user profile vector including an indication of a time that the at least one document was experienced by the user, and an indication of a frequency with which the user has experienced the at least one document (block S50). The method further includes determining a corresponding at least one weight for at least one word in the at least one document, the corresponding at least one weight being based at least on the time that the at least one document was experienced by the user and the frequency with which the user experienced the at least one document (block S52). A word cloud associated with the user is generated, the word cloud including the at least one word from the at least one document if the corresponding at least one weight of the at least one word at least meets a threshold (block S54). In some embodiments, the method further includes periodically collecting words from a plurality of documents experienced by the user; and dynamically updating the word cloud associated with the user based at least on the periodic collecting.

In some embodiments, the content experienced by the user may be parsed or extracted to collect individual words or phrases from the content. In further embodiments, weights may be assigned to the words of the content according to a relevance of the respective word to the user and/or to the content itself, and the words having a weight above a predetermined threshold may be associated with the user and may be used to generate a word cloud for the user.

Figure 4:
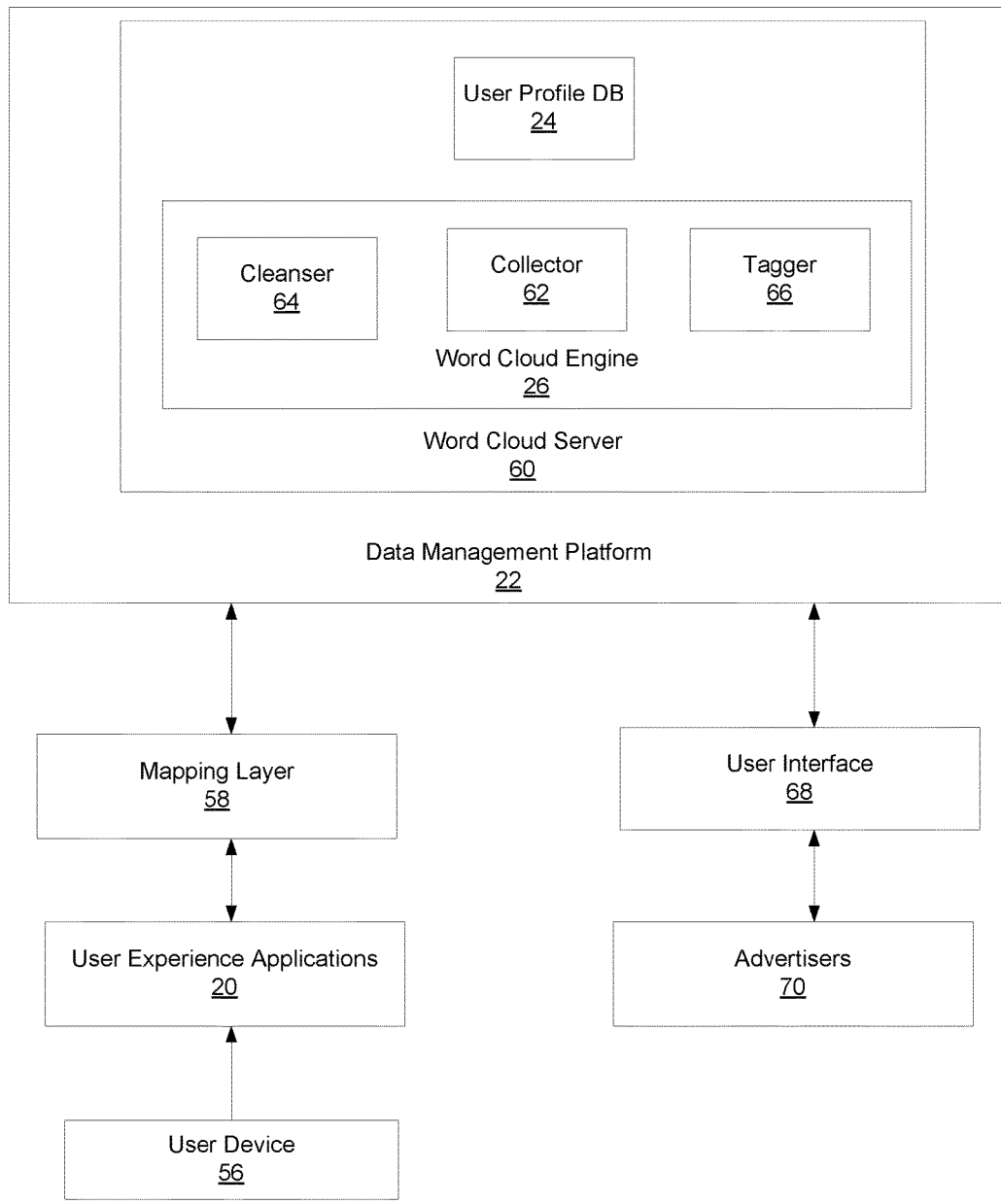
FIG. 4 is a block diagram of an exemplary system according to one embodiment of the present disclosure.

Referring now primarily to FIG. 4, an exemplary system according to one embodiment of the present disclosure is shown. User devices 56 may access or be accessed by one or more of the user experience applications 20 over the network. The user devices 56 may, for example, experience and/or interact with the applications 20. The user devices 56 may, for example, experience and/or interact with one or more content provider servers via the applications 20. The user devices 56 may experience and/or interact with one or more content provider servers that are connected to one or more of the applications 20, which applications 20 may collect data associated with the user devices' 56 interactions with the content provider servers. The user data gathered via the user experience applications 20 may be input into a mapping layer 58. In one embodiment, the mapping layer 58 may include computer instructions and/or processing circuitry configured to execute the computer instructions to cause the mapping layer 58 receive output from the user experience applications 20 and normalize the received data into a consistent format interpretable by the word cloud engine 26 for generating a word cloud user profile. The word cloud engine 26 may be part of a word cloud server 60 and the word cloud server 60 may be included in the data management platform 22.

The word cloud engine 26 may have one or more processes and one or more sub-processes configured to perform one or more of the techniques and methods described herein. The word cloud engine 26 may be implemented in software, hardware and/or any combination of hardware and software, such as the computing device 40. The word cloud engine 26 may include a collector 62, a cleanser 64, and a tagger 66, which may be considered sub-processes within the word cloud engine 26. The output from these sub-processes may be stored in the user profile database 24 on the word cloud server 60.

The user interface 68 may be used by users, such as, for example, advertisers 70, to access information on the word cloud server 60. In one embodiment, a word cloud associated with a user may be considered a word cloud user profile and may be stored on the user profile database 24, which may be accessible by, for example, advertisers 70 via the user interface 68. In some embodiments, the word cloud user profile may be considered a novel type of user profile unlike existing user profiles associated with user network activity. As will be described in more detail below, generation of the novel word cloud user profile as described herein involves extracting relevant words from digital content, analyzing words to form useful groupings, and providing useful information to users (e.g., advertisers 70) regarding conventionally subjective aspects of human behavior, such as, for example, determining potential interests and characteristics of human users. As one example, advertisers 70 may access the word cloud server 60, via the user interface 68, to identify a set of users for a particular advertising campaign that may correspond to a target audience for the campaign.

Figure 5:
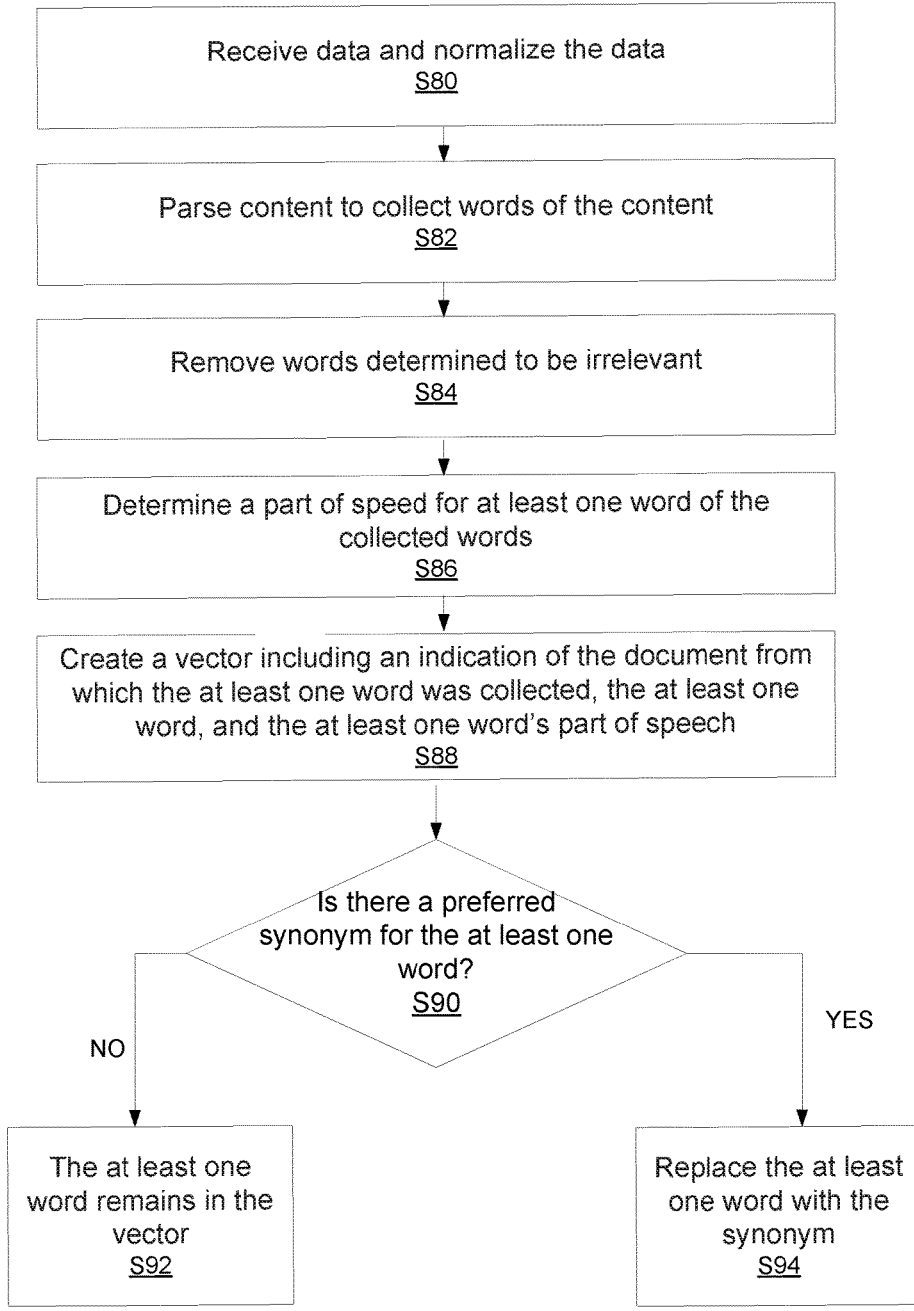
FIG. 5 is a flowchart of an exemplary method according to one embodiment of the present disclosure.

FIG. 5 is a flowchart illustrating one exemplary method for extracting words from content experienced by a user over the network. The exemplary method may be performed by the mapping layer 58, the collector 62, and the cleanser 64. The method may include receiving data from the user experience applications 20 and normalizing the data, via the mapping layer 58, to a consistent data format recognizable by the word cloud engine 26 and the word cloud server 60 (block 580). As one example, the mapping layer 58 may group the content according to, for example, the source of the content. The mapping layer 58 may also format the data so that the data can be received and interpreted by the word cloud server 60 (e.g., according to an Application Programming Interface (API) associated with the server 60). In other embodiments, the mapping layer 58 may normalize the data from the applications 20 in other ways. After the data is normalized in the mapping layer 58, the data may be input into the word cloud engine 26 of the word cloud server 60.

The collector 62 may parse content experienced by a user to collect words of the content (block 582). Each word may reflect or may not reflect an attribute, characteristic, interest, behavior and/or quality of the user. Thus, at least some of the techniques herein are designed to identify the words that are relevant to the user and those that are not relevant, and to group the relevant words into meaningful and useful categories associated with the user into a novel type of user profile, namely, a word cloud user profile. For example, a user may visit a website, which may be considered a "document," including a plurality of words and/or phrases with semantic or linguistic meanings. The word cloud engine 26, and particularly, the collector 62, may parse information from the user visited website. The information may include, but is not limited to: meta data, title, headlines, paragraph text, page contents from outer influential links from the website to other websites, and other user initiated events. Page contents from the outer influential links to other websites may be parsed also up to a depth of level 1 in order to extract potentially more relevant metadata and page content. The influential links may be determined by, for example, a size of a href text size. Other user initiated events may include clicking links to other websites, clicking on other advertisements, etc. The collector 62 may also be configured to determine which words correspond to a title or a major headline based on, for example, text size relative to other text sizes within the page.

After the collector 62 collects words associated with the document, the cleanser 64 may "clean" the collected words my removing words determined by the cleanser 64 to be irrelevant (block S84). Irrelevant words may include, for example, all stop words from documents and/or words whose length is less than a certain number of characters long. The cleanser 64 may also clean the collected words by converting plural words into their singular counterparts. In one embodiment, a word document synonym pairing function may be configured to normalize similar words to the same word in order to improve processing efficiency. In other words, less processing may be required by the computing device 40 to distinguish between similar words if such similar words can be treated as the same word. The cleanser 64 may determine a part of speed for each word of the collected words of the document (block 586). This may be performed by a parts of speech tagger function that may determine a word's significance in sentences within the document. The cleanser 64 may also create a word document synonym pair, which may be considered a vector including an indication of the document from which the word was collected, the word, and the word's part of speech (block 588). For each word, the cleanser 64 may determine whether there is a preferred synonym for the word (block S90). If there is no preferred synonym, the word remains within the word document synonym pair (block S92). If there is a preferred synonym, the word may be replaced with the preferred synonym (block S94). The preferred synonym may be, for example, a word that is the smallest word in lexicographical order. The synonym that is the smallest in lexicographical order may be based on, for example, alphabetical order. In some embodiments, the cleanser 64 may use other and/or additional methods and techniques for cleansing the collected words to include only relevant words, thereby reducing the processing required by, for example, the computing device 40.

Figure 6:
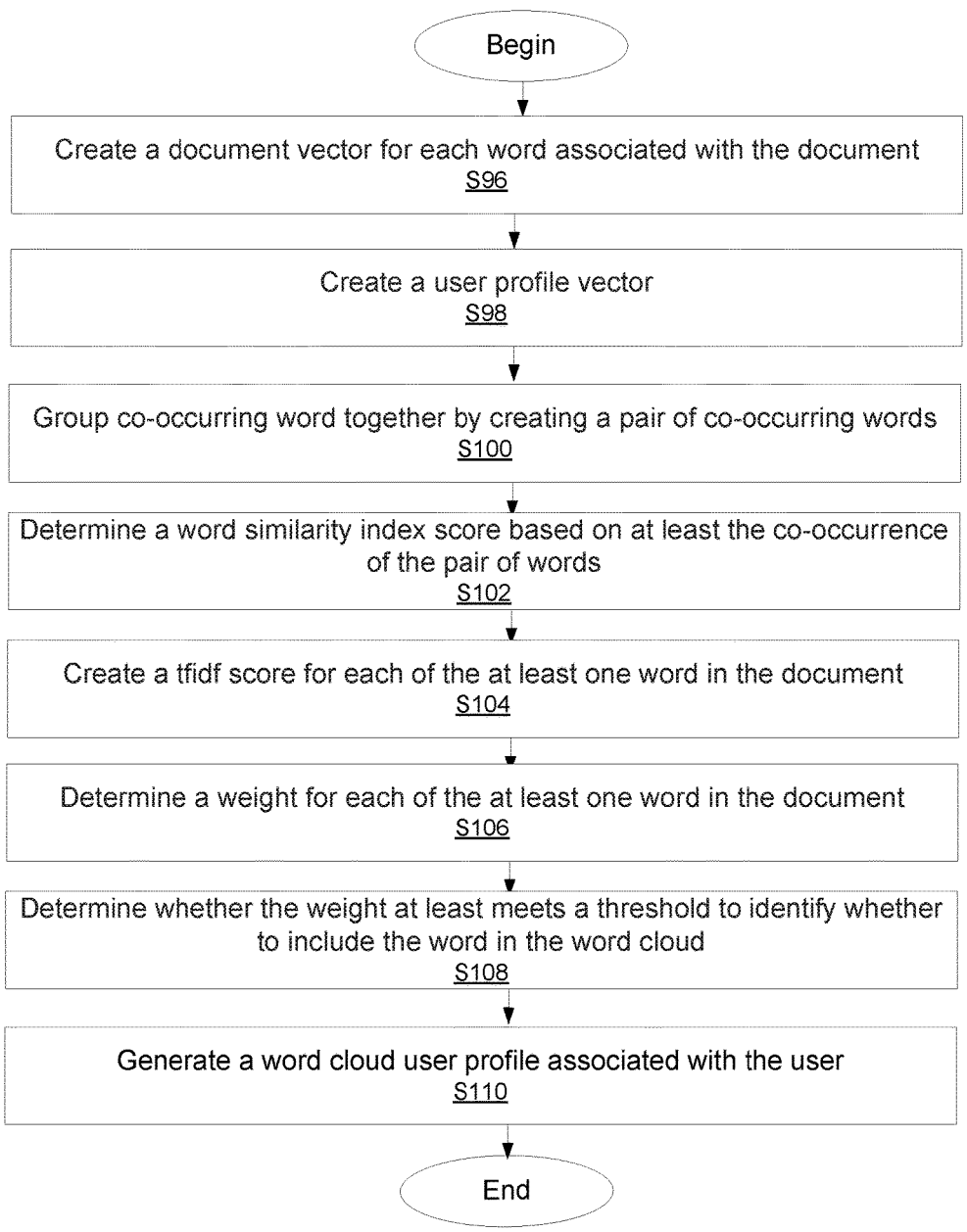
FIG. 6 is a flowchart of another exemplary method according to one embodiment of the present disclosure.

Referring now primarily to FIG. 6, a flowchart is described illustrating an exemplary method for building the word cloud user profile. In some embodiments, after the relevant words have been collected, by e.g., the collector 62, and cleansed by, e.g., the cleanser 64, the tagger 66 may create a document vector for each word associated with the document (or more specifically each word of the document left over after the normalization, collection and cleansing process) and the word's part of speech (block S96). The tagger 66 may also create a user profile vector based on, for example, the websites visited by the user, a timestamp for when the user visited the websites, and a frequency of visitation of each of the user-visited websites (block 598). For example, the user profile vector may include an indication of the document visited, the timestamp of when the document was visited by the user, and the frequency of user visitation for the website within a certain period of time. Each word associated with the user may then be associated with the timestamp. Each word associated with the user may also be associated with the frequency of user visitation within the period. The frequency of user visitation may, for example, reflect a number of times when content from which the word was independently parsed was experienced by the user.

Thus, in some embodiments, each word associated with the user according to these techniques may be associated with a multitude of data points, such as visitation frequency for one or more websites from which the word was extracted, as well as, timestamps for such visitations. In this manner, words may be tracked across multiple user contact instances and across multiple websites. As one simple example, a particular user may be interested in a particular breed of dog, which may result in the user researching the dog breed across multiple educational and ecommerce websites and the user may post content about the dog breed in the user's social media account, etc. This user network behavior may be tracked by aspects of the present invention over time, which may be translated into a fairly high relevancy score for the word indicating the dog breed (e.g., "poodle"). These scores or weights may be dynamically updated (e.g., the most recent user visitation for any content including the word "poodle" may be over one year ago, which may result in a reduction of the weight or score for the word within the user's word cloud).

The tagger 66 may group co-occurring words together by creating a pair of words based on the document and the part of speech (block S100). In one embodiment, co-occurring words may be considered words that are included in the same document (e.g., both the word "dog" and "poodle" may be a co-occurring pair if both words are included in a website article about different types of dog breeds).

In some embodiments, the tagger 66 may determine a word similarity index score based on at least the co-occurrence of the pair of words (block S102). In one embodiment, the similarity index score may be determined by dividing the co-occurrence of the pair of words by the unique documents in each set of words. For example, the similarity index score may be the sum of the count of the same document and part of speech pairs divided by the total number of unique document and part of speech pairs and the count of the same documents divided by the total number of unique documents. In some embodiments, the similarity index score may also incorporate or depend from the Jaccard index and/or Levene's Test.

In some embodiments, the tagger 66 may create a clustering of the words based on at least the similarity index score, where the word pairs or groups of words having a high similarity index score may be placed relative to each other in a plot that reflects or determines, for example, how statistically similar the word pair or groups of words are to one another. In one embodiment, given any word, all the words related to the word according to the word groupings may be retrievable.

In some embodiments, the tagger 66 may further calculate a term frequency-inverse document frequency (tfidf) score for each of one or more words in the document and the document (block S104). The tfidf score may be considered a weight and/or a weighting factor that, for example, corrects for words that are more common in general. In one embodiment, the tfidf score may be determined based on, for example, the document vector, the user profile vector, and/or the similarity index score. In one embodiment, the tfidf score may be a weighting factor that is a statistical measure of a relevance of the word. In one embodiment, such weighting factor may be used in a weighting function to determine the weight for the word.

In some embodiments, the weight for each of the one or more words of the document may be determined by the tagger 66 (block S106). The weight may be a factor of one or all of the tfidf, a duration from the timestamp of the last user experience associated with the word and/or the document, and the frequency that the user has experienced the document. In some embodiments, a weighting function may use one or more of such weighting factors to calculate the weight for the word. In some embodiments, each word experienced by the user, each user interaction, each user engagement, etc. tracked by the system 10 may be assigned a score. In some embodiments, this may be considered a method of calculating to determine if the words can be clustered together into a same category. In some embodiments, at least a portion of the weight/weighting function statistically determines a relevancy of the word to the user's overall online activity, as well as, the relevancy of the word to the content in the document. In some embodiments, the user's online activity, coupled with search data (which may in some embodiments be considered the highest form of intent data with the highest statistical score/relevant) is a factor fir the score of the word cloud. With such activity, the word cluster may have a higher tfidf score for a cluster.

The tagger 66 may use a threshold (e.g., a cutoff score) to determine relevant associated words (block S108). The threshold may be used to filter out words that are not statistically relevant to the user. For example, the threshold may be a weight threshold value that determines whether or not the word should be included in the word cloud. For example, words with a weight that does not at least meet the threshold weight value may be excluded from the word cloud. The threshold may be applied at any time in some embodiments to remove irrelevant words from consideration. In some embodiments, the threshold score may be applied after the tfidf score has been determined. In other embodiments, for each pair of words that are determined to be sufficiently similar (based on e.g. a predetermined similarity threshold value), the tagger 66 may consider each word as the same word in the tfidf score calculation. This may reduce the processing effort. In other embodiments, the threshold may be applied in the cleanser 64 sub-process, where synonyms for words having a weight above a threshold cutoff score may be associated with the user.

Having normalized, parsed, collected, cleansed, and weighted the words from the document, as described herein above, the tagger 66 can generate a word cloud user profile associated with the user (block S110). In one embodiment, the tagger 66 may also dynamically update an existing word cloud user profile of the user by periodically collecting words for a plurality of documents visited by the user over time. In some embodiments, the tagger 66 may be configured to periodically collect words at predetermined intervals. In some embodiments, the tagger 66 may be configured to collect and update the user's word cloud user profile each time new information associated with the user is received by the word cloud engine 26. The word cloud user profile may also be considered a word tag cloud and may be stored on the user profile database 24. In some embodiments, for each user in the database 24, the tagger 66 may generate and/or update the word cloud tag based on any one or more of the user profile vector, the similarity index score, the tfidf score, and the timestamp. In some embodiments, more recent timestamps may be given more weight. In some embodiments, the tag may correspond to the word cloud user profile. In some embodiments, the words associated with the user may form a cluster of words that are associated with a unique user identifier and may be stored in the user profile database 24 on the word cloud server 60.

The database 24 may be configured to be keyword searchable via, for example, the user interface 68. The user interface 68 may include at least one keyword search field. In one embodiment, based on the user-input keyword(s) entered into the at least one keyword search field, the user interface 68 and/or the word cloud server 60 may be configured to identify the user profile vectors stored in the database 24 associated with the word clouds having one or more words matching the user-input keyword. In further embodiments, based on the user-input keyword(s), the user interface 68 and/or the word cloud server 60 may also be configured to identify how many user profile vectors have word clouds with at least one word matching the user-input keyword(s). Such results of the keyword search may be displayable on a computer display via the user interface 68.

FIG. 7 illustrates an exemplary user interface 68 according to one embodiment of the present disclosure. The user interface 68 may include keyword search fields (or other known user input elements, e.g., drop-down menus, tabs, check-boxes, etc.) that allow advertisers 70 to specify demographics for users they desire to search for in the user profile database 24. Such demographics may include without limitation age, gender, language, location (e.g., country, state, city, zip code, etc.). The demographics may include other information as well. The user interface 68 may also include a keyword search field to allow the advertiser 70 to specify an interest, characteristic, or other attribute of the types of users the advertiser 70 seeks to target. In some embodiments, if the search results do not return a desired number of users matching the search, the advertiser 70 may perform a reach extension by including a Boolean search incorporating words suggested via the user interface 68. The user interface 68 may also indicate the unique reach and monthly impressions of the free form search.

Accordingly, one or more embodiments of the present disclosure may provide a type of user profile in the form of a word cloud user profile, where words experienced by the user's network activity may be analyzed and grouped together based on categories determined by statistical weights. Other users, such as advertisers, may access a database of these word cloud user profiles to identify users that may correspond to a target audience for an advertisement campaign. Advertisers can search for users with keywords that match keywords in the users' word cloud profiles. Having identified such users by accessing the word cloud server, advertisers can use this information to more efficiently bid on space via the advertising exchanges in order to be able to display ads to the targeted users.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A computing device for determining attributes of at least one user from words of at least one document experienced by the at least one user via a network, the computing device comprising processing circuitry and at least one memory storing instructions executable by the processing circuitry to:
   provide a user profile vector based at least on at least one document experienced by a user, the user profile vector including an indication of a time that the at least one document was experienced by the user, and an indication of a frequency with which the user has experienced the at least one document;
   determine a corresponding at least one weight for at least one word in the at least one document, the corresponding at least one weight being based at least on the time that the at least one document was experienced by the user and the frequency with which the user experienced the at least one document;
   generate a word cloud associated with the user, the word cloud including the at least one word from the at least one document if the corresponding at least one weight of the at least one word at least meets a threshold;
   communicate with at least one database; and
   cause the user profile vector and the associated word cloud to be stored in the at least one database, the at least one database being configured to be keyword searchable, via a user interface with at least one keyword search field, to:
      identify user profile vectors stored in the at least one database associated with word clouds having one or more words matching at least one user-input keyword, and
      identify how many of the user profile vectors have word clouds with at least one word matching the at least one user-input keyword.

2. The computing device according to claim 1, wherein the threshold includes a cutoff score used to filter out words that are not statistically relevant to the user.

3. The computing device according to claim 1, wherein the user profile vector further includes a user identifier associating each data element in the user profile vector with the user.

4. The computing device according to claim 1, wherein the processing circuitry is further configured to generate the word cloud associated with the user by being configured to at least:
   identify co-occurring words in the at least one document;
   determine a word similarity index score for each of the identified co-occurring words; and
   group each of the co-occurring words together based on the corresponding word similarity index score.

5. The computing device according to claim 4, wherein the processing circuitry is further configured to group each of the co-occurring words together based on the corresponding word similarity index score by being configured to use the similarity index score to form a cluster of words where word groups having a similarity index score above a similarity threshold are clustered together, the cluster of words representing how similar each word in the word groups are to one another.

6. The computing device according to claim 1, wherein the processing circuitry is further configured to calculate a term frequency-inverse document frequency (tfidf) score for the at least one word, the tfidf score representing a weighting factor that is a statistical measure of a relevance of the at least one word, the weighting factor being used at least in part to determine the corresponding at least one weight for the at least one word.

7. The computing device according to claim 1, wherein the processing circuitry is further configured to generate the word cloud associated with the user by being configured to:
   create a document vector for each of at least one collected word from the at least one document, the at least one collected word being collected by parsing content from the at least one document, and, for each of the at least one collected word, the document vector including at least a document identifier and an indication of a part of speech of the word.

8. The computing device according to claim 1, wherein the at least one document is at least one website visited by the user and the at least one word is at least one word associated with the at least one website visited by the user.

9. The computing device according to claim 8, wherein the at least one word associated with the at least one website visited by the user includes at least one of metadata associated with the at least one website, website content of the at least one website, and website content from an influential link from the at least one website to another website.

10. The computing device according to claim 1, wherein the corresponding at least one weight is a weighting function, the weighting function including at least one weighting factor, the at least one weighting factor representing relevance of the at least one word to content of the at least one document.

11. The computing device according to claim 1, wherein the processing circuitry is further configured to:
   periodically collect words from a plurality of documents experienced by the user; and
   dynamically update the word cloud associated with the user based at least on the periodic collecting.

12. The computing device according to claim 1, wherein the corresponding at least one weight includes a weighting factor that is based on a duration, the duration beginning with the time that the at least one document was experienced to a second time, the second time occurring after the time.

13. The computing device according to claim 1, wherein the indication of the frequency with which the user has experienced the at least one document represents a number of times that the at least one word has been independently parsed from the at least one document as a result of an instance of visitation of the at least one document by the user.

14. The computing device according to claim 1, wherein the processing circuitry is in communication with a mapping layer, the mapping layer configured to:
   receive data from one or more applications in communication with a user equipment of the user over a network; and
   normalize the data to a data format recognizable by a word cloud engine configured to generate the word cloud associated with the user.

15. The computing device according to claim 1, wherein the instructions stored on the at least one memory correspond to a word cloud engine configured to generate the word cloud associated with the user and periodically update the word cloud based on new user data input into the word cloud engine.

16. The computing device according to claim 1, wherein each word in the word cloud associated with the user reflects an attribute of the user, the attribute including at least one of a characteristic of the user, an interest of the user, and a demographic associated with the user.

17. A method for determining attributes of at least one user from words of at least one document experienced by the at least one user via a network, the method comprising:
   providing a user profile vector based at least on at least one document experienced by a user, the user profile vector including an indication of a time that the at least one document was experienced by the user, and an indication of a frequency with which the user has experienced the at least one document;
   determining a corresponding at least one weight for at least one word in the at least one document, the corresponding at least one weight being based at least on the time that the at least one document was experienced by the user and the frequency with which the user experienced the at least one document;
   generating a word cloud associated with the user, the word cloud including the at least one word from the at least one document if the corresponding at least one weight of the at least one word at least meets a threshold;
   communicating with at least one database; and
   causing the user profile vector and the associated word cloud to be stored in the at least one database, the at least one database being configured to be keyword searchable, via a user interface with at least one keyword search field, to:
      identify user profile vectors stored in the at least one database associated with word clouds having one or more words matching at least one user-input keyword, and
      identify how many of the user profile vectors have word clouds with at least one word matching the at least one user-input keyword.

18. The method according to claim 17, further comprising:
   periodically collecting words from a plurality of documents experienced by the user; and
   dynamically updating the word cloud associated with the user based at least on the periodic collecting.

19. A system for determining attributes of at least one user from words of at least one document experienced by the at least one user via a network, the system comprising:
   processing circuitry configured to:
      provide a user profile vector based at least on at least one document experienced by a user, the user profile vector including an indication of a time that the at least one document was experienced by the user, and an indication of a frequency with which the user has experienced the at least one document;
      determine a corresponding at least one weight for at least one word in the at least one document, the corresponding at least one weight being based at least on the time that the at least one document was experienced by the user and the frequency with which the user experienced the at least one document; and
      generate a word cloud associated with the user, the word cloud including the at least one word from the at least one document if the corresponding at least one weight of the at least one word at least meets a threshold; and
   at least one database in communication with the processing circuitry, the at least one database being configured to store the user profile vector and being configured to be key word searchable, via a user interface, to:
      identify user profile vectors stored in the at least one database associated with word clouds having one or more words matching at least one user-input keyword, and
      identify how many of the user profile vectors have word clouds with at least one word matching the at least one user-input keyword.

* * * * *